United States Patent Office 3,317,505
Patented May 2, 1967

3,317,505
POLYOLEFIN COMPOSITIONS
Harry Braus, Springdale, Ohio, assignor to National Distillers and Chemical Corporation, New York, N.Y., a corporation of Virginia
No Drawing. Filed Oct. 10, 1963, Ser. No. 315,387
4 Claims. (Cl. 260—94.9)

This invention relates to additives for polyolefins, and, more particularly, it relates to anti-static agents for polyolefins.

Static charges on plastic materials have long been a problem. The charges accumulate on the plastic object, for example, polyolefin film or molded polyolefin, and remain there until discharged. These static charges give rise to many serious difficulties, foremost among which is the collection of dust. Not only does the dust make the product unattractive aesthetically, but also it results in practical problems, as when, for example, the plastic article is used as part of mechanical or electrical equipment. Another important problem involves the handling of the polyolefin film, that is, when static charges are present, film clings to rolls.

With the rapidly increasing use of polyolefins as containers for foods, cosmetics, drugs, bleaches, and the like, it has become necessary that polyolefins, especially polyethylene, polypropylene, and their copolymers with each other and with other comonomers, be made as nearly static-free as possible without deleterious effect on the other properties of the polyolefins that make them particularly useful as containers. This means that, when anti-static properties are added, the product should retain its slip and anti-blocking characteristics; its optical properties, particularly gloss and clarity; and its acceptability for food and drug use. In addition, by eliminating static build-up, downtime and product loss are reduced, the danger of fire or explosion is decreased, the product remains clean longer, and the amount of cleaning required in minimized.

It is an object of this invention to provide a means of making polyolefins substantially non-susceptible to the accumulation of electrostatic charges.

Another object is to provide polyolefins that are resistant to the accumulation of static charges on the surface thereof over long periods of time.

A further object is to effect the destaticization of polyolefins with materials that can be added in extremely small amounts.

Additional objects and advantages will be apparent from the following detailed description.

In addition to having no adverse effect on the slip, block, optical, and FDA-approved characteristics, an antistatic agent should be compatible with the polymer that it is being used to treat and it should possess an abundance of polar groups.

It has now been found that compounds prepared by the reaction of an olefin oxide with an alkanolamine are compatible with polyolefins and that small amounts of such a compound or mixture of compounds are effective in imparting anti-static properties to a polyolefin.

In general, the anti-static agents of this invention are product mixtures prepared by the following illustrative equation:

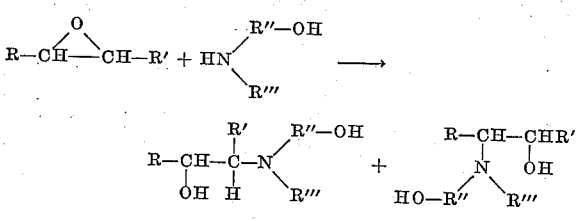

The olefin oxide can be any compound of the general structure

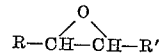

wherein R is a saturated aliphatic hydrocarbon radical having from about 8 to 22 carbon atoms and R' is hydrogen or a saturated aliphatic hydrocarbon radical having from about 1 to 6 carbon atoms. Examples of the epoxide include 1,2-decylene epoxide, 1,2-dodecylene epoxide, 1,2,-hexadecylene epoxide, 1,2-octadecylene epoxide, 1,2-tetracosenyl epoxide, 2,3-dodecylene epoxide, 7,8-octadecylene epoxide, and the like. Terminal epoxides, that is those in which R' is hydrogen, are preferred.

The alkanolamine can be any compound having the general structure

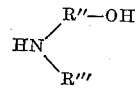

wherein R'' is a saturated aliphatic hydrocarbon diradical having from 2 to about 6 carbon atoms and R''' is hydrogen, an alkylol radical having from 2 to about 6 carbon atoms, or a saturated aliphatic hydrocarbon radical having from 1 to about 6 carbon atoms. Suitable alkanolamines are monoethanolamine, diethanolamine, diisopropanolamine, monohexanolamine, N-propyl-N(B-hydroxyethyl)amine, N-methyl-N(γ-hydroxypropyl)amine, and the like. Compounds wherein R''' is hydrogen or an alkylol radical are preferred.

The novel reaction mixtures of this invention are prepared by reacting at elevated temperature 1 mole of an epoxide with from 1 to 2 moles, and preferably 1 to 1.5 moles, of an alkanolamine. It is preferred, but not essential, that the amount of alkanolamine be in excess throughout the reaction; the epoxide, therefore, preferably is introduced gradually to the alkanolamine as the reaction proceeds. An inert diluent may be used, although its use is not preferred.

The reaction temperature should be in the range of about 130° to 200° C., and preferably the temperature is between about 150° and 180° C.

Completion of the reaction, ascertained by the disappearance of the epoxide, is followed by the removal of any excess alkanolamine by vacuum distillation. The reaction should be carried out under an inert atmosphere, e.g., nitrogen, argon, or helium, in order to avoid the production of undesired colored impurities.

The novel products of the process of this invention are generally mixtures of N-hydroxyalkyl alkanolamines, such as for example a mixture of N-hydroxyhexadecyl diethanolamine and N-hydroxyoctadecyl diethanolamine, of 2-hydroxy-N-B-hydroxyethylamino octadecane and 1-hydroxy-2-(N-B-hydroxyethylamino) octadecane, of N-hydroxyhexadecyl diisopropanolamine and N-hydroxyoctadecyl diisopropanolamine, and of 2-hydroxy-N-B-hydroxyethylamino dodecane and 1-hydroxy-2-(N-B-hydroxyethylamino) dodecane.

The resulting product has been found to be a satisfactory anti-static agent when combined with a polyolefin in an amount ranging from about 0.1 to 1.5 parts per hundred parts by weight of the polyolefin. Within this range the amount of additive required to impart a satisfactory level of anti-static behavoir to a polyolefin body or layer generally increases as the thickness of the polyolefin body or layer increases. For example, for a relatively thin layer of polyolefin, e.g., a polyolefin film, it is preferred to use from about 0.10 to about 0.15 part of additive per hundred parts of polyolefin. For a relatively thick layer of polyolefin, e.g., that which generally constitutes the walls of a blown bottle, it is preferred to use from about 0.5 to about 1.0 part of additive per hundred parts of polyolefin.

The compositions may be prepared by any method that is suitable for insuring a uniform mixture of the polyolefin and the anti-static agents. Suitable methods include the addition of the additive compounds as solids, in solution in inert solvents, or as slurries in water or in other non-solvents to the polyolefin which may be in the form of either dry fluff or molding powder, followed by drying and tumbling the mixture. The additive also can be incorporated into the polyolefin by melt blending the ingredients in conventional apparatus, such as a Banbury mixer, heated rolls, or a plasticator. It is also possible to prepare a concentrate of the additive in the polyolefin by one of the aforesaid methods; this concentrate then can be blended with polyolefin molding powder by tumbling, Banbury mixing, or other suitable means. In addition, various combinations of the above methods can also be used.

The polyolefin compositions that have been destaticized by the compounds of this invention are particularly useful for fabrication by extrusion into thin films, sheets, blown bottles, blown tubing, and the like. The compositions may also be cast or molded into films, sheets, rods, tubes, piping, filaments, and other shaped articles. In addition the compositions may be used for coating paper, cloth, wire, metal foil, glass fiber mats, synthetic and natural textiles, and other substrates.

In addition to the anti-static additives disclosed herein, the polyolefin compositions may be compounded with small amounts of other additives, such as high melting waxes, anti-oxidants, dyes and pigments, lubricants, and the like, provided that the additional ingredients are not present in amounts sufficient to alter substantialy the effectiveness of the agents employed to inhibit the accumulation of static charges.

The invention will be more fully understood by reference to the following examples which are not intended to limit the scope of the invention except as indicated by the appended claims. Unless otherwise specified, all parts are given by weight.

FILM PREPARATION

The additive was dry-blended with the polyolefin in powder form. The resulting blend was then fed into a 1¼-inch Egan extruder and extrusion-blown into 0.5- to 1-mil tubular film at extrusion temperatures ranging from about 275° to 350° F.

FILM TESTING (A) *Cigarette Ash Test.*—A piece of the film 6" x 12" was rubbed 10 times with a wool cloth. The film was then brought down slowly toward a fresh mound of cigarette ashes. At some finite height a sudden and rapid pick-up of ashes occured to films retaining a static charge. This height was recorded in inches. It varied directly with the intensity of charge on the film, qualitative values being assigned as follows:

TABLE 1

| Effectiveness of additive | Distance at which rapid ash pick-up occurs |
|---|---|
| Good | Less than 1 inch. |
| Fair | 1 to 4 inches. |
| Poor | Greater than 4 inches. |

(B) *Surface Resistivity Test.*—A 4" x 4" piece of film was placed between two electrodes which were in contact with both sides of the film. The ratio of the potential gradient parallel to the current along the film surface to the current per width of film surface is surface resistivity. It was measured with an electrometer. Surface resistivity decreases with decreases in the intensity of static charge on the surface, qualitative values being assigned as follows:

TABLE 2

| Effectiveness of additive | Surface resistivity, megohms |
|---|---|
| Good | Less than $10^4$. |
| Fair | $10^4$ to $5 \times 10^5$. |
| Poor | Greater than $5 \times 10^5$. |

BOTTLE PREPARATION

A concentrate of the additive in polyolefin was prepared by dry blending the polyolefin in powder form with 25 weight percent of the additive. This dry blend was then incorporated into the main portion of the polyolefin in a quantity that would yield the final desired level of anti-static agent. Incorporation was achieved by Banbury mixing at 280° F. for 7 to 8 minutes. The resulting homogeneous blend was granulated, fed into a 1¼-inch Egan extruder, and then extrusion-blow molded at a parison temperature of 375° to 385° F. and a mold temperature of 50° to 60° F. into 12-ounce rectangular bottles weighing 28 grams each. These bottles were conditioned for testing by placing them in a constant temperature and humidity room for 24 hours.

BOTTLE TESTING

The level of anti-static behaviour was evaluated by the Static Decay Test and the Soot Chamber Test. The former was employed primarily to measure the initial level of static charge and the rate of charge dissipation over a 24-hour storage period. It was found that effective additives generally showed lower initial voltage and rapid decay until essentially no charge was remaining after 24 hours. The Soot Chamber Test was used to measure directly the ultimate level of static charge achieved. Generally a value of zero in the Static Decay Test corresponded to a value of "slight" to "none" in the Soot Chamber Test.

A. *Static decay test.*—A blown bottle was rubbed 10 times with a fresh paper towel and allowed to stand in 50 percent relative humidity for 24 hours. The surface of the bottle was tested at the beginning and at the end of this period for the amount of static charge remaining by means of an electrostatic voltmeter (Custom Scientific Instruments Model CS66 Electrostatic Voltmeter).

B. *Soot chamber test.*—A blown bottle was rubbed 10 times with a fresh paper towel and allowed to stand in a soot chamber for 24 hours. At the end of this period soot produced from the burning of toluene-saturated filter paper in a separate combustion chamber was circulated around the bottle for 15 minutes. The bottle was then checked visually for soot deposition and assigned a value of "heavy," "medium," "slight," or "none."

Example I

A mixture of $C_{16}$–$C_{18}$ 1,2-epoxides (0.2 m.) was added dropwise to diethanolamine (0.3 m.) over a period of 1½ hours at 150° to 170° C. under nitrogen. The reaction was completed at 175° C. by heating the mixture for an additional 3 hours. The product was cooled to 50° C. Excess diethanolamine was removed by vacuum distillation. The product had a melting range of 28° to 33° C. and was a mixture of N-hydroxyhexadecyl diethanolamine and N-hydroxyoctadecyl diethanolamine. These structures were verified by infrared analysis.

Example II

The procedure of Example I was repeated except that 2-octadecylene epoxide was reacted with monoethanolamine. The product had a melting point in the range of 36° to 44° C. Infrared analysis confirmed the presence in the product of a major portion of 2-hydroxy-N-B-hydroxyethylamino octadecane and a minor portion of 1-hydroxy-2-(N-B-hydroxyethylamino) octadecane.

Example III

The procedure of Example I was repeated except that a mixture of $C_{16}$–$C_{18}$ 1,2-epoxides was reacted with diisopropanolamine. Infrared analysis indicated that the product was a mixture of N-hydroxyhexadecyl diisopropanolamine and N-hydroxyoctadecyl diisopropanolamine.

Example IV

The procedure of Example I was repeated except that 1,2-dodecylene epoxide was reacted with monoethanolamine. The product was a white solid having a melting point of 66° to 68° C. Infrared analysis indicated a major portion of the product to be 2-hydroxy-N-B-hydroxyethylamino dodecane and a minor portion to be 1-hydroxy-2-(N-B-hydroxyethylamino) dodecane. Nitrogen analysis showed 5.44 percent of N (found); 5.79 percent of N was calculated.

The additives prepared by the procedures of Examples I, II, III, and IV were compounded with polyethylene (conventional in the cases of I, II, and III and linear in the case of IV); the compositions were formed into films or bottles, as indicated in Table 3; and the films and bottles were tested. The results of the tests on the films and bottles containing an anti-static agent were compared with results of tests on polyethylene films and bottles containing no anti-static agent. These data are tabulated below.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

What is claimed is:

1. A composition comprising a polyolefin and an anti-static agent, said anti-static agent comprising a mixture of compounds having the general structures

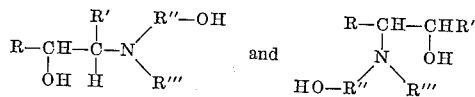

wherein R is a saturated aliphatic hydrocarbon radical having from about 8 to 22 carbon atoms; R' is a member of the group consisting of hydrogen and a saturated aliphatic hydrocarbon radical having from about 1 to 6 carbon atoms; R'' is a saturated aliphatic hydrocarbon diradical having from 2 to about 6 carbon atoms; and R''' is a member of the group consisting of hydrogen, an alkylol radical having from 2 to about 6 carbon atoms, and a saturated aliphatic hydrocarbon radical having from 1 to about 6 carbon atoms.

2. The composition of claim 1 wherein the polyolefin is polyethylene.

TABLE 3

| Example | Resin | Blend | | Evaluation | |
|---------|-------|-------|---|------------|---|
| | | Additive, Percent | Form Tested | Test | Value |
| (1) | Polyethylene density 0.922 melt index 9.1 | 0 | Blown Film | (2) | 5–9. |
| I | do | 0.15 | do | (3) | 5×10⁶. |
| II | do | 0.15 | do | (2) | 0. |
| III | do | 0.15 | do | (3) | 2×10⁴. |
| | | | | (2) | 1–2. |
| (4) | Linear Polyethylene density 0.960 melt index 6.0 | 0 | Blown bottle | (2) | 2–3. |
| IV | do | 0.75 | do | (5) | Initial, 140,000; Final, 100,000. |
| | | | | (6) | Heavy. |
| IV | do | 0.50 | do | (5) | Initial, 36,000; Final, 0. |
| | | | | (6) | Slight. |
| | | | | (5) | Initial, 17,000; Final, 0. |
| | | | | (6) | Slight. |

¹ Film Control.
² Cigarette Ash Test.
³ Surface Resistivity Test.
⁴ Bottle Control.
⁵ Static Decay Test.
⁶ Soot Chamber Test.

As can be seen from the above data, the addition of anti-static agents to polyethylene resulted in products that were superior in all of the tests to polyethylenes containing no such additives.

Example V

The anti-static agent prepared by the procedure of Example I was incorporated into polypropylene (density 0.905, melt flow rate at 230° C., 5.0) and the resulting composition was formed into blown film and blown bottles. The results of tests made on the fabricated products were comparable to those obtained with linear polyethylene containing an anti-static agent.

3. The composition of claim 1 wherein the polyolefin is polypropylene.

4. The composition of claim 1 wherein the amount of anti-static agent is in the range of about 0.1 to 1.5 parts per 100 parts by weight of the polyolefin.

References Cited by the Examiner

UNITED STATES PATENTS 2,856,363   10/1958   Brennan _____ 260—584

JOSEPH L. SCHOFER, *Primary Examiner.*

L. EDELMAN, *Assistant Examiner.*